(12) United States Patent
Porter et al.

(10) Patent No.: US 7,717,067 B2
(45) Date of Patent: May 18, 2010

(54) PET GROOMING TOOL AND METHOD OF MANUFACTURING PET GROOMING TOOLS

(75) Inventors: David R. Porter, Sunset Hills, MO (US); Angela L. Porter, Sunset Hills, MO (US)

(73) Assignee: FURminator, Inc., Fenton, MO (US)

( * ) Notice: Subject to any disclaimer, the term of this patent is extended or adjusted under 35 U.S.C. 154(b) by 50 days.

(21) Appl. No.: 11/490,753

(22) Filed: Jul. 20, 2006

(65) Prior Publication Data

US 2008/0029044 A1    Feb. 7, 2008

(51) Int. Cl.
*A01K 13/00* (2006.01)
(52) U.S. Cl. .................. 119/601; 119/632; 119/625
(58) Field of Classification Search .............. 119/600, 119/601, 611, 612, 613, 615, 616, 617, 625, 119/628, 631, 632, 633, 664; 300/21; 425/542, 425/805; 264/299, 334; 132/120, 219; 15/167.1, 15/106, 110, 111, 143.1
See application file for complete search history.

(56) References Cited

U.S. PATENT DOCUMENTS

| | | | |
|---|---|---|---|
| 441,136 A | 11/1890 | Clements | |
| 0,486,295 A | 11/1892 | Pflueger | |
| 487,580 A | 12/1892 | Neuls | |
| 1,875,125 A | 8/1932 | Oster et al. | |
| 1,888,688 A | 11/1932 | Oster | |
| D142,930 S | 11/1945 | Adler | |
| D152,375 S | 1/1949 | Seley | |
| D229,619 S | 12/1973 | Sleith | |
| 3,986,258 A | 10/1976 | Liedtke | |
| 4,444,711 A | 4/1984 | Schad | |
| 4,532,707 A | 8/1985 | Allen | |
| D285,252 S | 8/1986 | Audette | |
| 4,663,841 A | 5/1987 | Custer | |
| D292,532 S | 10/1987 | Strongwater | |
| D305,818 S | 1/1990 | Chen | |
| D307,963 S | 5/1990 | Newman et al. | |
| D318,157 S | 7/1991 | Perior | |
| 5,407,622 A * | 4/1995 | Cleveland et al. | ........... 264/104 |
| 5,465,449 A | 11/1995 | Lewkowicz | |
| D368,999 S | 4/1996 | Chen | |
| D381,483 S | 7/1997 | Hartman | |
| D408,998 S | 5/1999 | Choi et al. | |
| 6,782,846 B1 | 8/2004 | Porter | |
| 6,973,855 B2 | 12/2005 | Yanosaka et al. | |
| 7,077,076 B2 | 7/2006 | Porter et al. | |
| 7,159,274 B2 | 1/2007 | Freidell | |
| 2004/0010876 A1 | 1/2004 | Kraemer | |

(Continued)

OTHER PUBLICATIONS

"Grooming Tools" section, Care-a-Lot Pet Supply Catalogue, Oct. 2003, p. 62.

(Continued)

*Primary Examiner*—T. Nguyen
(74) *Attorney, Agent, or Firm*—Thompson Coburn LLP; Clyde L. Smith

(57) ABSTRACT

A pet grooming tool comprises a pet engageable portion formed of polymeric material and having a plurality of teeth. A method of forming a pet grooming tool comprises molding a pet engageable portion out of a first polymeric material and thereafter over-molding a handle portion to the pet engageable portion.

9 Claims, 5 Drawing Sheets

U.S. PATENT DOCUMENTS

2006/0032458 A1* 2/2006 Hutchinson et al. ......... 119/603
2006/0037556 A1 2/2006 Porter
2007/0119383 A1 5/2007 Porter et al.
2007/0143945 A1* 6/2007 DiPietro et al. ............... 15/188

OTHER PUBLICATIONS

"Grooming Tools" section, Drs Foster and Smith Catalogue, Nov. 2002, pp. 103, 105.

"Grooming Tools" section, Jeffers Pet Catalogue, 2002, pp. 84, 85.

* cited by examiner

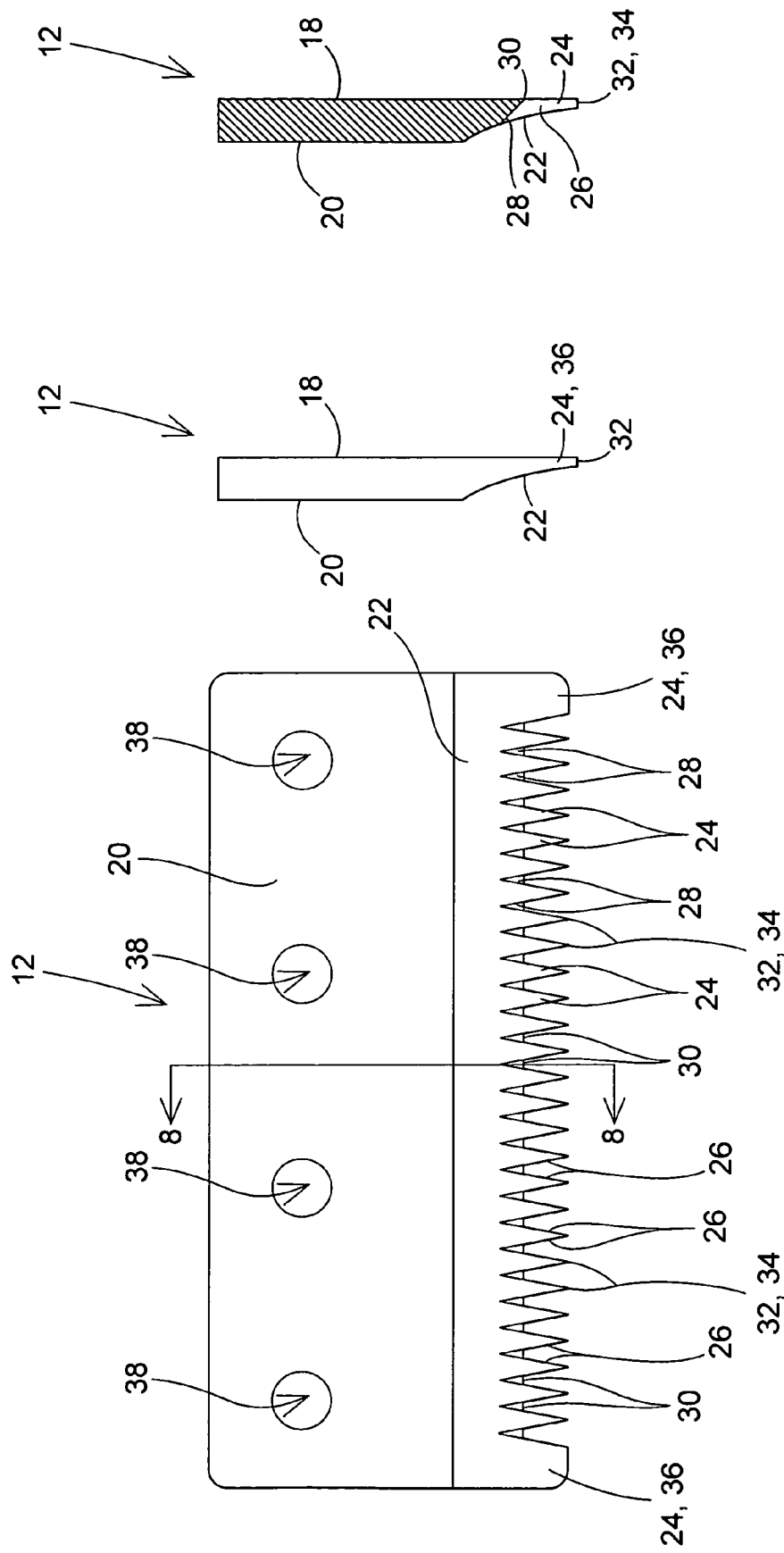

US 7,717,067 B2

PET GROOMING TOOL AND METHOD OF MANUFACTURING PET GROOMING TOOLS

BACKGROUND OF THE INVENTION

This invention pertains to pet grooming tools of the type used to remove loose hair from pets without cutting or pulling non-loose hair from the pets. The disclosure of U.S. Pat. No. 7,077,076 entitle "Pet Grooming Tool" and issued Jul. 18, 2006, is hereby incorporated in its entirety by reference.

SUMMARY OF THE INVENTION

In a first aspect in accordance with the invention, a pet grooming tool comprises a pet engageable portion and a handle portion. The pet engageable portion has a plurality of teeth and is formed of a first polymeric material having first tensile yield strength. The handle portion is secured to the pet engageable portion and is formed of a second polymeric material. The second polymeric material has a second tensile yield strength that is less than the first tensile yield strength.

In a second aspect in accordance with the invention, a pet grooming tool comprises a pet engageable portion. The pet engageable portion is formed of a polymeric material and has a plurality of teeth arranged in a row. The pet engageable portion comprises a first surface and a plurality of intersecting surfaces. Each of the intersecting surfaces intersects the first surface in a manner forming an acute edge segment. The edge segments and the teeth alternate with each other along the row. Each of at least two adjacent teeth of the plurality of teeth comprises a tooth surface. The tooth surface of one of the two adjacent teeth acutely intersects the tooth surface of the other of the two adjacent teeth.

In a third aspect in accordance with the invention, a method comprises injection molding a pet engageable portion of a pet grooming tool out of a first polymeric material in a manner such that the pet engageable portion comprises a plurality of teeth arranged in a row. The method further comprises placing the pet engageable portion into an injection molding cavity. Still further, the method comprises injecting a second polymeric material into the mold cavity while the pet engageable portion is in the mold cavity in a manner forming a handle portion out of the second polymeric material that is secured to the pet engageable portion. The second polymeric material is different from the first polymeric material.

While the principal features of the invention have been described above, a more complete and thorough understanding of the invention may be obtained by referring to the drawing figures and the detailed description of the preferred embodiments, which follow.

BRIEF DESCRIPTION OF THE DRAWING FIGURES

FIG. 6 is a front view of the pet engageable portion of the pet grooming tool shown in FIGS. 1-5.

FIG. 7 is a side projection view of the pet engageable portion of the pet grooming tool shown in FIG. 7.

FIG. 8 is a cross-sectional view of the pet engageable portion of the pet grooming tool shown in FIGS. 6 and 7 taken about the line 8-8 shown in FIG. 6.

Figure 1:
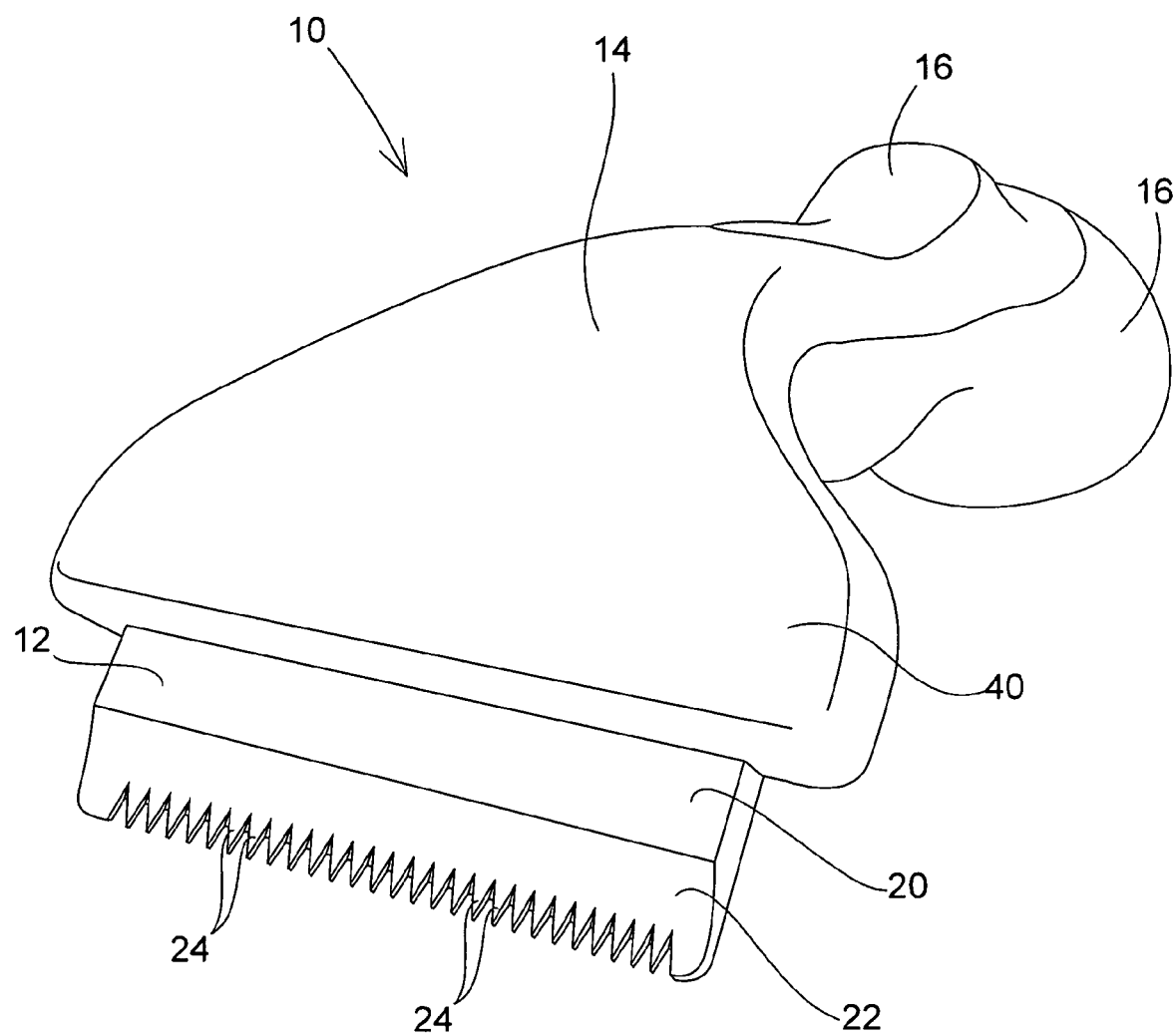
FIG. 1 is a perspective view of the preferred embodiment of a pet grooming tool in accordance with the invention.

Reference numerals in the written specification and in the drawing figures indicate corresponding items.

DETAILED DESCRIPTION OF THE PREFERRED EMBODIMENTS OF THE INVENTION

Figure 2:
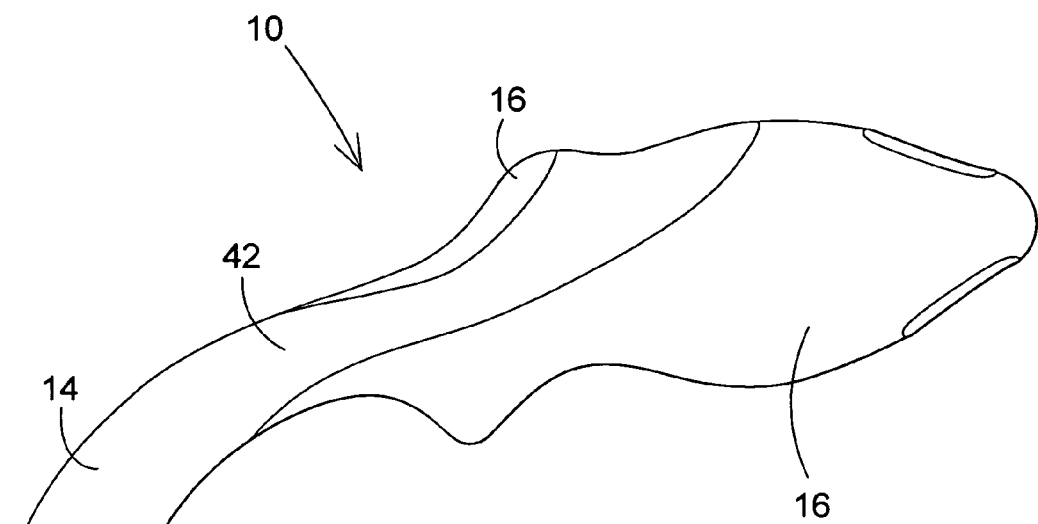
FIG. 2 is a side view of the pet grooming tool shown in FIG. 1.
Figure 3:
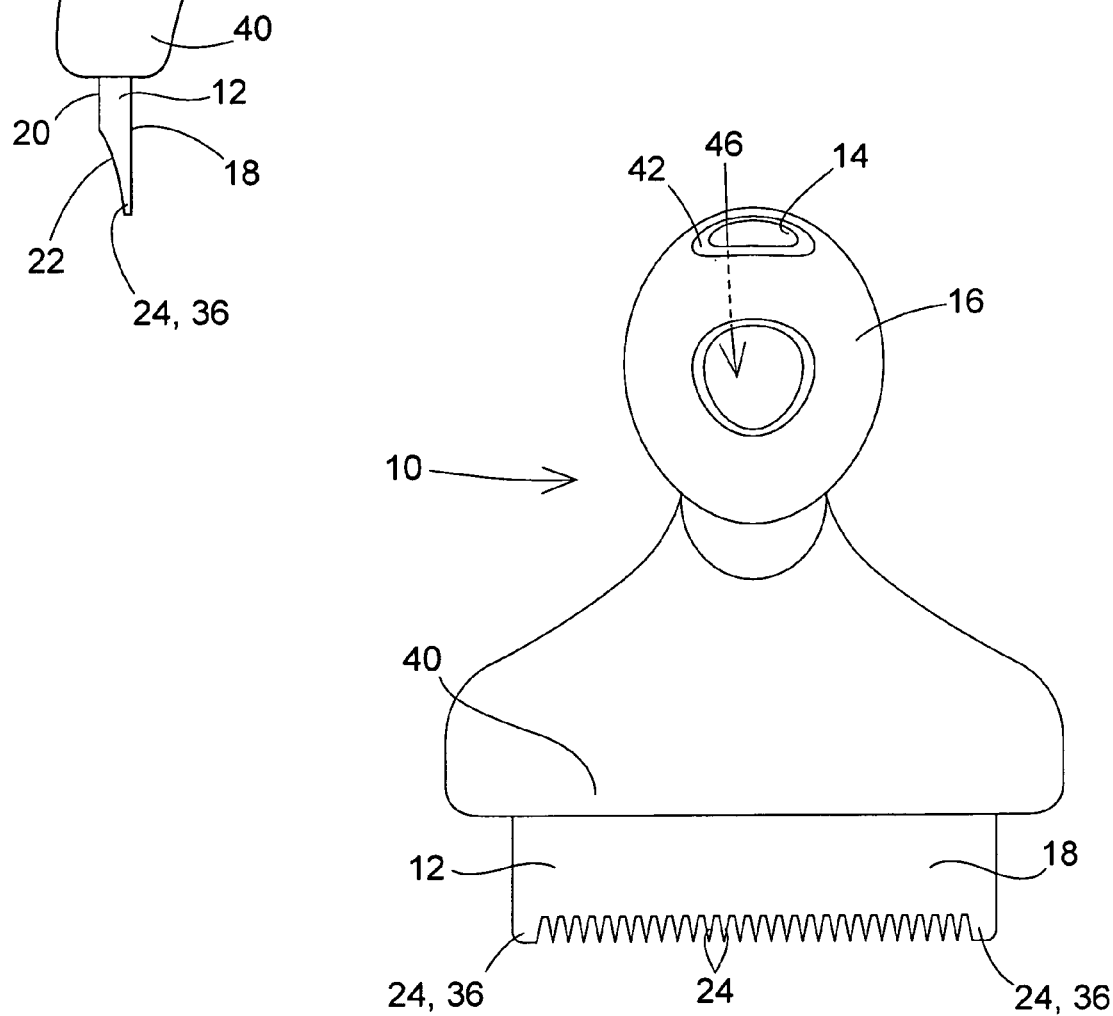
FIG. 3 is a rear view of the pet grooming tool shown in FIGS. 1 and 2.
Figure 4:
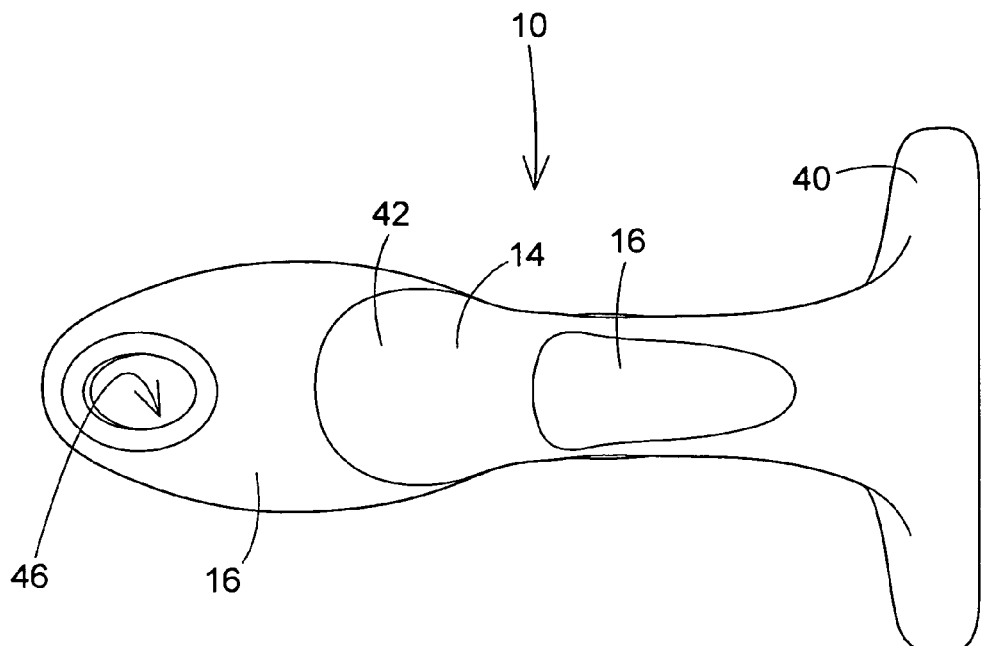
FIG. 4 is a top view of the pet grooming tool shown in FIGS. 1-3.
Figure 5:
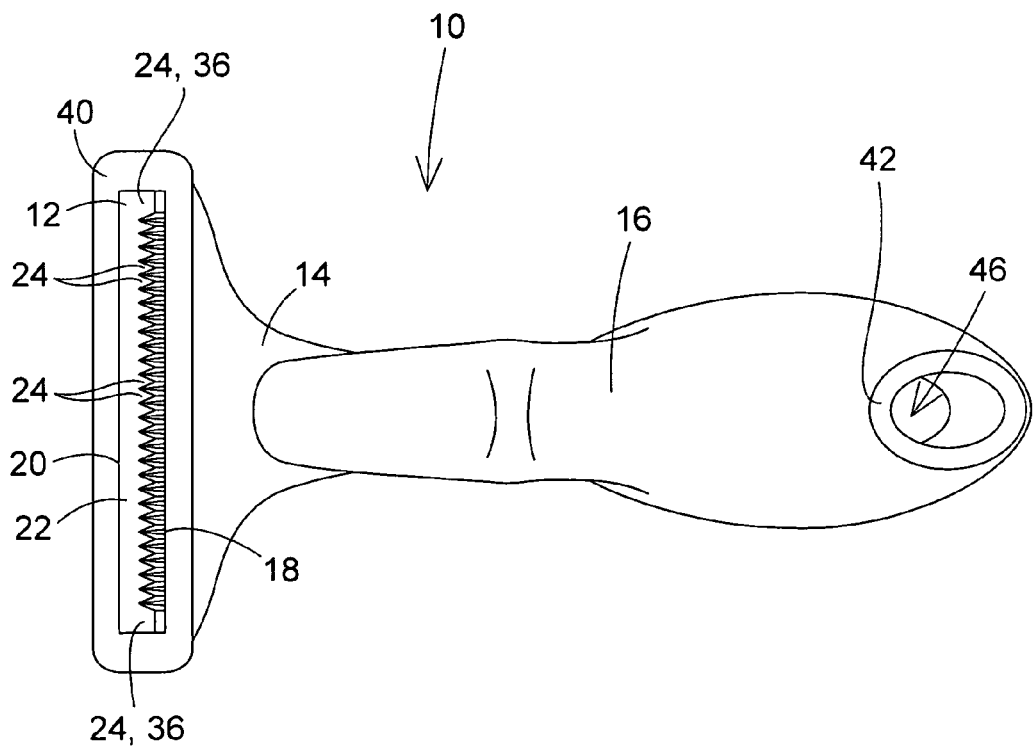
FIG. 5 is a bottom view of the pet grooming tool shown in FIGS. 1-4.
Figure 9:
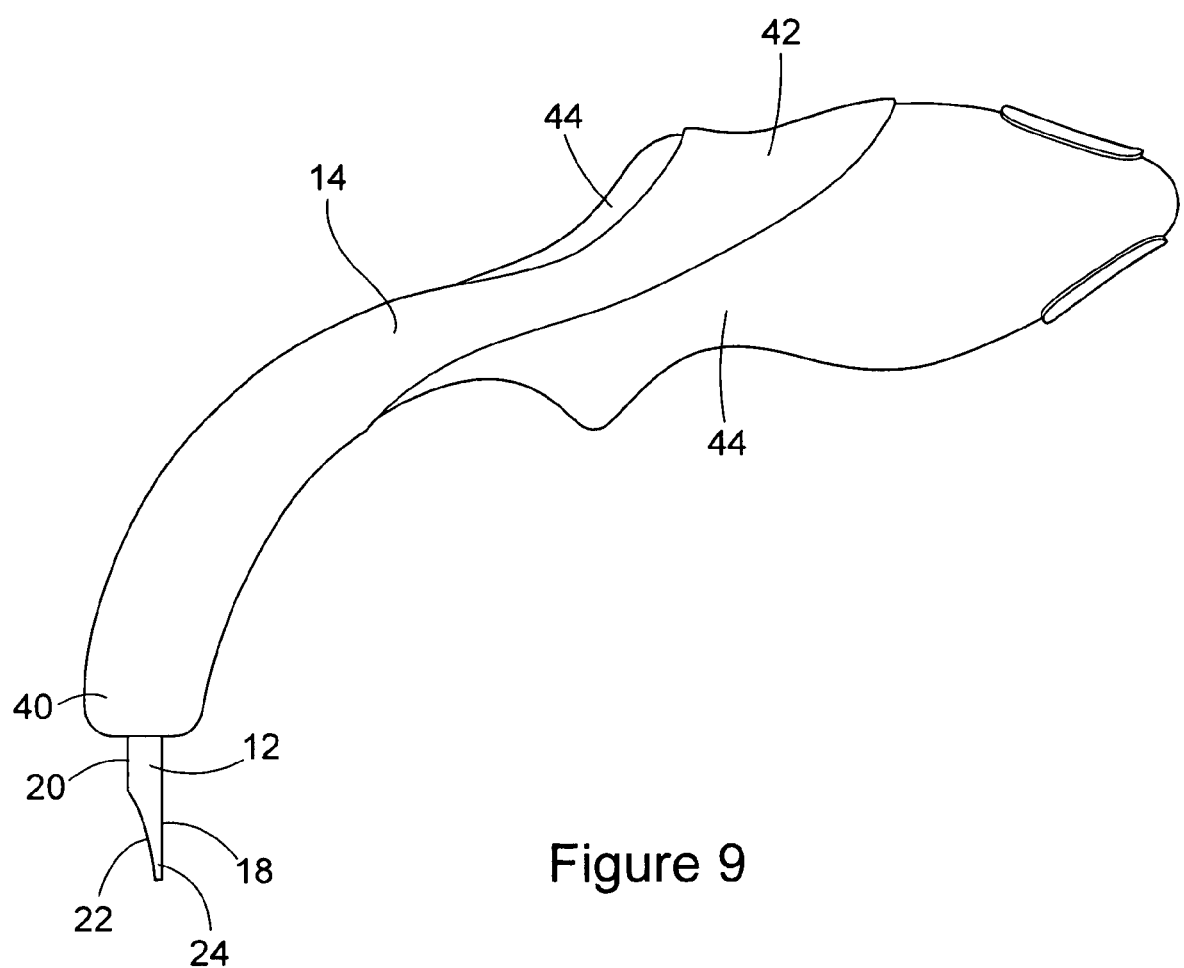
FIG. 9 is a side view of the handle and pet engageable portions of the pet grooming tool shown in FIGS. 1-5 shown without the grip portion attached to the handle portion.

A preferred embodiment of a pet grooming tool in accordance with the invention is shown in FIGS. 1-5 and indicated by reference numeral 10. The pet grooming tool 10 comprises a pet engageable portion 12, a handle portion 14, and a grip portion 16.

The pet engageable portion 12 of the pet grooming tool 10 is formed of a polymeric material, preferably by using an injection molding process. Preferably but not necessarily, the polymeric material that forms the pet engageable portion 12 is either polycarbonate or acetal, which have relatively high tensile yield strength and good creep resistance as compared to other less expensive polymeric materials. As shown most clearly in FIGS. 6-8, the pet engageable portion 12 preferably is generally rectangular in shape and preferably comprises a planar rear surface 18 and a parallel planar front surface 20. Preferably, an arcuate surface 22 of the pet engageable portion 12 extends down from the front surface 20 and tapers therefrom toward the rear surface 18.

A plurality of teeth 24 are preferably formed in a row along the bottom of the pet engageable portion 12. Each tooth 24 is preferably bound in front by the arcuate surface 22, in the rear by the rear surface 18 and, except for the first and last teeth in the row, by two tooth side surfaces 26. An intersecting surface 28 is preferably formed between each adjacent pair of the teeth 24. Each intersecting surface 28 is preferably planar and preferably extends from the arcuate surface 22 to the rear surface 18 in a manner creating an acute horizontal edge segment 30 with the rear surface. Each edge segment 30 preferably has an edge angle of between forty-five degrees and seventy-five degrees, and more preferably of approximately sixty degrees.

The tooth side surfaces 26 of each tooth 24 acutely intersect the side tooth surfaces of each adjacent tooth at the root of the tooth. It is from such intersections that the intersecting surfaces 28 extend downward toward the edge segments 30. The tooth side surfaces 26 of any given tooth 24, excluding the first and last teeth 36, also preferably acutely intersect each other at the tip 32 of said tooth in a manner forming an acute edge 34 that extends horizontally and generally perpendicular to the edge segments 30. The tips 32 of the first and last teeth 36 in the row preferably do not have acute edges. Additionally, the first and last teeth 36 are preferably wider than the other teeth to reduce the likelihood of damaging the teeth in the event that the pet grooming tool is dropped. Preferably there are between thirteen and fourteen of the teeth 24 per inch along the row of teeth and preferably the tips 32 of the teeth are approximately an eighth of an inch below the edge segments 30 of the pet engageable portion 12.

The upper portion of the pet engageable portion 12 may optionally comprise one or more openings 38 or other indentations. Such openings 38 or indentations create cavities in the pet engageable portion 12 that allow the handle portion 14 of the pet grooming tool 10 to be secured to the pet engageable portion via interlocking geometry, but are not necessary if the handle portion is melt bonded to the pet engageable portion.

After the pet engageable portion 12 has been formed, it is preferably placed in another mold into which another polymeric material is injection molded to form the handle portion 14. The polymeric material used to form the handle portion 14 can be any one of commonly used engineering plastics such as ABS, nylon, and polypropylene, and is preferably less expensive than the polymeric material used to form the pet engageable portion. Notably, the material used to form the handle portion 14 needs not be as creep resistant nor have as high a yield strength as the material used to form the pet engageable portion 12. Preferably however, the polymeric material used to form the handle portion 14 has a melt temperature close to that of the polymeric material used to form the pet engageable portion 12 such that the materials become melt-bonded to each other when the handle portion is formed. Alternatively, the pet engageable portion 12 can be provided with cavities, such as the openings 38 shown in FIG. 6, so that the handle portion 14 becomes geometrically interlocked with the pet engageable portion when formed therearound.

The mold used to form the handle portion 14 is preferably shaped such that, when formed, the handle portion comprises a base portion 40 that encircles the upper portion of the pet engageable portion 12, and an elongate portion 42 extending therefrom. The elongate portion 42 of the handle portion 14 is preferably shaped to be grasped comfortably by hand. Additionally, the elongate portion 42 preferably comprises a plurality of recessed areas 44 and a through-hole 46 at its distal end. The through-hole is provided simply to provide means for hanging the pet grooming tool 10 from a hook or the like, and for provided means for attaching a lanyard to the pet grooming tool.

After forming the handle portion 14 of the pet grooming tool 10, the assembly of the handle portion 14 and the pet engageable portion 12 is then placed in yet another mold. This mold preferably has a shape similar to the mold used to form the handle portion 14, except at areas where the recesses on the handle portion are located. This mold is configured so that yet another polymeric material, such as thermoplastic polyurethane, styrene-ethylene/butylene-styrene copolymer, copolyesters, copolyamides, thermoplastic rubber, or thermoplastic vulcanate, can be injected molded into the recessed areas 44 of the handle portion 14 to form the grip portion 16 of the pet grooming tool 10. The grip portion 16 preferably has an outer contour that meets flush with the outer contour of the handle portion adjacent the recessed areas 44. The polymeric material used to form the grip portion 16 preferably is softer than the polymeric material used to form the handle portion 14 and preferably has a higher coefficient of friction. As such, the grip portion 16 increases the comfort and improves the grip when grasping the pet grooming tool 10.

The pet grooming tool 10 is preferably utilized to remove loose hair from a furry pet, such as a dog or cat, without cutting or pulling non-loose hair from the pet. In use, a person grasps the handle portion 14 of the pet grooming tool 10 and presses the pet engageable portion 12 of the tool into the fur of a pet. Preferably the pet grooming tool 10 is held in a manner such that rear surface 18 of the pet engageable portion 12 is generally perpendicular to the skin of the furry pet. The pet grooming tool is then preferably pulled in a manner such that the front surface 20 of the pet engageable portion 12 trials behind the rear surface 18 of the pet engageable portion. As the pet grooming tool 10 is pulled, both loose and non-loose hair passes between the teeth 24 of the pet engageable portion 12. The acute angle of edge segments 30 facilitates the ability of the pet engageable portion 12 to pull the loose hair from the pet without also cutting or pulling non-loose hair from the pet. Additionally, the acute shape of the tips 32 of the teeth 24 helps channel hair into the voids between the teeth 24, whereas blunter teeth would otherwise tend to mash hair against the skin of the pet.

While the present invention has been described in reference to a specific embodiment, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A method comprising:
   injection molding a pet engageable portion of a pet grooming tool out of a first polymeric material in a manner such that the pet engageable portion comprises a plurality of teeth arranged in a row and in a manner such that the pet engageable portion comprises at least one cavity;
   placing the pet engageable portion into an injection molding cavity;
   injecting a second polymeric material into the injection molding cavity while the pet engageable portion is in the mold cavity in a manner forming a handle portion out of the second polymeric material that is secured to the pet engageable portion and in a manner such that the handle portion is mechanically secured to the pet engageable portion via interlocking geometry created by the at least one cavity, the second polymeric material being different from the first polymeric material.

2. A method comprising:
   injection molding a pet engageable portion of a pet grooming tool out of a first polymeric material in a manner such that the pet engageable portion comprises a plurality of teeth arranged in a row;
   placing the pet engageable portion into an injection molding cavity;
   injecting a second polymeric material into the injection molding cavity while the pet engageable portion is in the mold cavity in a manner forming a handle portion out of the second polymeric material that is secured to the pet engageable portion and in a manner such that the second polymeric material melts a surface of the pet engageable portion as the second polymeric material in injected into the mold cavity and thereby creates a melt-bond between the handle portion and the pet engageable portion, the second polymeric material being different from the first polymeric material wherein the first polymeric material has a first tensile yield strength and the second polymeric material has a second tensile yield strength, and wherein the first tensile strength is greater than the second tensile yeild strength.

3. A method in accordance with claim 1 wherein the first polymeric material has a first tensile yield strength and the second polymeric material has a second tensile yield strength, and wherein the first tensile yield strength is greater than the second tensile yield strength.

4. A method in accordance with claim 3 wherein the injection molding cavity constitutes a first injection molding cavity and wherein the method further comprises steps of:

placing the handle portion and the pet engageable portion into a second injection molding cavity; and injecting a third polymeric material into second injection molding cavity while the pet engageable portion and the handle portion are in the second injection molding cavity in a manner forming at least one hand-grip portion formed out of the third polymeric material and in a manner such that the third polymeric material melts at least one surface of the handle portion as the third polymeric material is injected into the second injection molding cavity and thereby creates at least one melt-bond between the handle portion and the at least one hand-grip portion, the third polymeric material being different form the first and second polymeric materials.

5. A method in accordance with claim 1 wherein the step of injection molding the pet engageable portion occurs in a manner such that the pet engageable portion comprises a first surface and a plurality of intersecting surfaces, each of the intersecting surfaces intersects the first surface in a manner forming an acute edge segment, and the edge segments and the teeth alternate with each other along the row.

6. A method in accordance with claim 2 wherein the injection molding cavity constitutes a first injection molding cavity and wherein the method further comprises steps of:

placing the handle portion and the pet engageable portion into a second injection molding cavity; and injecting a third polymeric material into the second injection molding cavity while the pet engageable portion and the handle portion are in the second injection molding cavity in a manner forming at least one hand-grip portion formed out of the third polymeric material and in a manner such that the third polymeric material melts at least one surface of the handle portion as the third polymeric material is injected into the second injection molding cavity and thereby creates at least one melt-bond between the handle portion and the at least one hand grip portion, the third polymeric material being different form the first and second polymeric materials.

7. A method in accordance with claim 6 wherein the step of injection molding the pet engageable portion occurs in a manner such that the pet engageable portion comprises a first surface and a plurality of intersecting surfaces, each of the intersecting surfaces intersects the first surface in a manner forming an acute edge segment, and the edge segments and the teeth alternate with each other along the row.

8. A method in accordance with claim 2 wherein the step of injection molding the pet engageable portion occurs in a manner such that the pet engageable portion comprises a first surface and a plurality of intersecting surfaces, each of the intersecting surfaces intersects the first surface in a manner forming an acute edge segment, and the edge segments and the teeth alternate with each other along the row.

9. A method in accordance with claim 4 wherein the step of injection molding the pet engageable portion occurs in a manner such that the pet engageable portion comprises a first surface and a plurality of intersecting surfaces, each of the intersecting surfaces intersects the first surface in a manner forming an acute edge segment, and the edge segments and the teeth alternate with each other along the row.

* * * * *